US011966389B2

(12) United States Patent
Sheinin et al.

(10) Patent No.: US 11,966,389 B2
(45) Date of Patent: Apr. 23, 2024

(54) NATURAL LANGUAGE TO STRUCTURED QUERY GENERATION VIA PARAPHRASING

(71) Applicant: International Business Machines Corporation, Armonk, NY (US)

(72) Inventors: Vadim Sheinin, Yorktown Heights, NY (US); Zhiguo Wang, Yorktown Heights, NY (US); Lingfei Wu, Elmsford, NY (US); Kun Xu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 16/275,303

(22) Filed: Feb. 13, 2019

(65) Prior Publication Data

US 2020/0257679 A1    Aug. 13, 2020

(51) Int. Cl.
| | |
|---|---|
| *G06F 16/242* | (2019.01) |
| *G06F 16/2455* | (2019.01) |
| *G06F 16/248* | (2019.01) |
| *G06F 16/28* | (2019.01) |
| *G06F 40/30* | (2020.01) |
| *G06N 3/08* | (2023.01) |

(52) U.S. Cl.
CPC ........ *G06F 16/243* (2019.01); *G06F 16/2455* (2019.01); *G06F 16/248* (2019.01); *G06F 16/284* (2019.01); *G06N 3/08* (2013.01); *G06F 40/30* (2020.01)

(58) Field of Classification Search
CPC .. G06F 16/243; G06F 16/2455; G06F 16/248; G06F 16/284; G06F 40/30; G06F 16/3344; G06N 3/08

USPC ......................................... 707/759
See application file for complete search history.

(56) References Cited

U.S. PATENT DOCUMENTS 5,386,556 A  * 1/1995 Hedin ..................... G06F 40/58
6,615,172 B1 * 9/2003 Bennett ............. G06F 16/24522
                                              704/257
(Continued)

FOREIGN PATENT DOCUMENTS

CA       3062071 A1 * 11/2018  ....... G06F 16/24522
CN     104331449 A  *  2/2015  ......... G06F 16/3332
(Continued)

OTHER PUBLICATIONS

Basik et al., "DBPal: A Learned NL-Interface for Databases," SIGMOD '18, Jun. 10-15, 2018, Houston, TX, USA, pp. 1765-1768. ( Year: 2018).*

(Continued)

*Primary Examiner* — Phuong Thao Cao
(74) *Attorney, Agent, or Firm* — Stosch Sabo

(57) ABSTRACT

A method (and structure and computer product) of machine translation for processing input questions includes receiving, in a processor on a computer, an input question presented in a natural language. The input question is preprocessed to find one or more condition values for possible Structured Query Language (SQL) queries. One or more possible SQL queries are enumerated based on the one or more found condition values and a paraphrasing model is used to rank the enumerated SQL queries. The highest ranked SQL query is executed against a relational database to search for a response to the input question.

17 Claims, 4 Drawing Sheets

(56) References Cited

U.S. PATENT DOCUMENTS

| | | | | |
|---|---|---|---|---|
| 6,665,640 | B1* | 12/2003 | Bennett | G09B 5/04 |
| | | | | 704/257 |
| 6,665,666 | B1* | 12/2003 | Brown | G06F 16/3338 |
| 7,051,037 | B1* | 5/2006 | Thomas | G06F 16/2465 |
| | | | | 707/999.102 |
| 8,346,791 | B1* | 1/2013 | Shukla | G06F 16/248 |
| | | | | 707/759 |
| 8,478,699 | B1* | 7/2013 | Alfonseca | G06F 16/951 |
| | | | | 706/12 |
| 9,002,869 | B2* | 4/2015 | Riezler | G06F 16/3338 |
| | | | | 707/760 |
| 9,218,390 | B2* | 12/2015 | Feng | G06F 16/9537 |
| 9,665,662 | B1* | 5/2017 | Gautam | G06F 16/24522 |
| 9,684,714 | B2 | 6/2017 | Levas et al. | |
| 10,037,368 | B1* | 7/2018 | Nandyalam | G06F 16/8358 |
| 10,157,203 | B2* | 12/2018 | Ajmera | G06F 16/3329 |
| 10,585,911 | B1* | 3/2020 | Bourne | G06F 40/253 |
| 11,120,341 | B1* | 9/2021 | Palfrey | G06N 5/022 |
| 11,651,236 | B2* | 5/2023 | Li | G06F 40/279 |
| | | | | 706/46 |
| 2002/0059069 | A1* | 5/2002 | Hsu | G10L 15/18 |
| | | | | 704/257 |
| 2002/0188587 | A1* | 12/2002 | McGreevy | G06F 16/3335 |
| 2003/0172066 | A1 | 9/2003 | Cooper et al. | |
| 2004/0030556 | A1* | 2/2004 | Bennett | G06F 40/20 |
| | | | | 704/270 |
| 2004/0117189 | A1* | 6/2004 | Bennett | G09B 7/00 |
| | | | | 704/270.1 |
| 2005/0080625 | A1* | 4/2005 | Bennett | G06F 16/24522 |
| | | | | 704/249 |
| 2005/0080780 | A1* | 4/2005 | Colledge | G06F 16/951 |
| 2006/0116987 | A1* | 6/2006 | Bernard | G06F 16/3329 |
| 2007/0136251 | A1* | 6/2007 | Colledge | G06F 16/3338 |
| 2009/0119090 | A1* | 5/2009 | Niu | G06F 40/44 |
| | | | | 704/1 |
| 2009/0119277 | A1* | 5/2009 | Dettinger | G06F 16/24522 |
| 2009/0254514 | A1* | 10/2009 | Adair | G06F 16/24534 |
| 2010/0099496 | A1* | 4/2010 | Imielinski | G06F 16/3338 |
| | | | | 463/42 |
| 2010/0228540 | A1 | 9/2010 | Bennett | |
| 2011/0093271 | A1* | 4/2011 | Bernard | G06F 16/40 |
| | | | | 704/257 |
| 2011/0320187 | A1* | 12/2011 | Motik | G06F 40/295 |
| | | | | 704/9 |
| 2012/0209590 | A1* | 8/2012 | Huerta | G06F 40/44 |
| | | | | 704/7 |
| 2013/0080472 | A1* | 3/2013 | Cohen | G06F 16/243 |
| | | | | 707/E17.128 |
| 2013/0159342 | A1* | 6/2013 | Cragun | G06F 16/972 |
| | | | | 707/769 |
| 2013/0198219 | A1* | 8/2013 | Cohen | G06F 16/243 |
| | | | | 707/E17.014 |
| 2013/0262107 | A1* | 10/2013 | Bernard | G06F 16/40 |
| | | | | 704/235 |
| 2014/0337371 | A1* | 11/2014 | Li | G06F 16/243 |
| | | | | 707/767 |
| 2014/0379755 | A1* | 12/2014 | Kuriakose | G06F 16/24522 |
| | | | | 707/780 |
| 2016/0171050 | A1* | 6/2016 | Das | G06F 16/90332 |
| | | | | 707/714 |
| 2017/0322939 | A1* | 11/2017 | Byron | G06N 20/00 |
| 2017/0329872 | A1* | 11/2017 | Dispensa | G06F 16/2471 |
| 2018/0061408 | A1* | 3/2018 | Andreas | G10L 15/063 |
| 2018/0095962 | A1* | 4/2018 | Anderson | G06F 16/24522 |
| 2018/0121480 | A1* | 5/2018 | Jaikumar | G06F 16/245 |
| 2018/0157664 | A1* | 6/2018 | Howell | G06N 20/10 |
| 2018/0165288 | A1* | 6/2018 | Chang | G06N 3/0445 |
| 2018/0174020 | A1* | 6/2018 | Wu | G06N 3/08 |
| 2018/0268023 | A1* | 9/2018 | Korpusik | G06F 40/30 |
| 2018/0329883 | A1* | 11/2018 | Leidner | G06F 16/2237 |
| 2018/0336198 | A1* | 11/2018 | Zhong | G06N 7/005 |
| 2018/0349377 | A1* | 12/2018 | Verma | G06F 16/248 |
| 2018/0349455 | A1* | 12/2018 | Nandyalam | G06F 16/258 |
| 2019/0034416 | A1* | 1/2019 | Al Hasan | G06N 3/08 |
| 2019/0042663 | A1* | 2/2019 | Gupta | G06F 40/279 |
| 2019/0102390 | A1* | 4/2019 | Antunes | G06F 40/295 |
| 2019/0251431 | A1* | 8/2019 | Keskar | G06F 40/56 |
| 2019/0272296 | A1* | 9/2019 | Prakash | G06F 16/90335 |
| 2019/0325068 | A1* | 10/2019 | Lai | G06F 16/951 |
| 2019/0340172 | A1* | 11/2019 | McElvain | G06N 5/041 |
| 2019/0392066 | A1* | 12/2019 | Kim | G06F 40/35 |
| 2020/0090034 | A1* | 3/2020 | Ramachandran | G10L 15/16 |
| 2020/0125663 | A1* | 4/2020 | Batta | G06F 7/14 |
| 2020/0210485 | A1* | 7/2020 | Motwani | G06K 9/6256 |

FOREIGN PATENT DOCUMENTS

| | | | | |
|---|---|---|---|---|
| CN | 107451153 A | | 12/2017 | |
| EP | 2731069 A1 | * | 5/2014 | G06F 16/33 |
| KR | 20200080822 A | * | 7/2020 | G06F 16/24522 |

OTHER PUBLICATIONS

Sathick et al., "Natural Language to SQL Generation for Semantic Knowledge Extraction in Social Web Sources," Indian Journal of Science and Technology, vol. 8(1), pp. 01-10, Jan. 2015. (Year: 2015).*

Sokolov et al., "Neural Machine Translation for Paraphrase Generation," Association for the Advancement of Artificial Intelligence, 2019, 6 pages. (Year: 2019).*

Mel, et al. "The NIST Definition of Cloud Computing". Recommendations of the National Institute of Standards and Technology. Nov. 16, 2015.

Utama, et al., "DBPal: An End-to end Neural Natural Language Interface for Databases"; arXiv.org; Apr. 2, 2018; Cornell University Library.

Giordani, et al., "Translating Questions to SQL Queries with Generative Parsers Discriminatively Reranked"; http://www. Aclweb. org; 2012; aclweb.

Huang, et al., "Natural Language to Structure Query Generation via Meta-Learning", arXiv: 1803.02400v3, Jun. 13, 2018; University of Washington.

Xu, et al., "SQLNet: Generating Structured Queries from Natural Language without Reinforcement Learning" ;arXiv: 1711.04436v1; Nov. 13, 2017; Tong University and University of California, Berkeley.

* cited by examiner

NATURAL LANGUAGE TO STRUCTURED QUERY GENERATION VIA PARAPHRASING

BACKGROUND

The present invention relates generally to machine translation into text. More specifically, a Structured Query Language (SQL) query is processed using a paraphrase-based model that measures similarity between sequences of utterances forming two sentences to predict matches in meaning of an input question to different possible SQL queries, thereby avoiding the need to train a new model when adapting to a new domain.

Natural Language Interface to Database: Business Usage (NLIDB) is important for machine reading comprehension, question answering, etc. Real applications of NLIDB include Deep QA, the term used by IBM for its ongoing research effort based on decades of experience in deep content analysis, natural language processing, information retrieval, machine learning, and artificial intelligence. A recent example of a Deep QA application was the performance of the Watson supercomputer on the television quiz show "Jeopardy!".

Existing method for NLIDB include rule-based methods and the more recent sequence-to-sequence based method.

The rule-based methods rely on syntactic rules such as dependency trees to understand the question and relies on handcrafted rules to map dependency patterns to SQL queries. These methods are very sensitive to dependency errors but do not require a large amount of training data. However, manually-created rules may not be sufficient to accommodate questions that have not been previously presented and so is considered as static per each database and/or domain.

The sequence-to-sequence based method views the NLIDB task as a sequence-to-sequence problem and uses existing deep-learning based method to map text to the SQL input query. However, the sequence-to-sequence based method requires many annotated training examples, which is time consuming and therefore not easily adapted to a new domain.

Therefore, these conventional methods demonstrate that challenges to conventional NLIDB include limited training data and adaptations to new domains. Relative to training data, the conventional methods require a lot of training data to learn mappings from natural language to SQL operations and structures and collecting question-SQL query pairs as training data is very time consuming. Relative to adapting to new domains, any model trained on question-SQL query pairs cannot easily be adapted to a new domain. Whenever adapting to a new domain, these models need to be trained on a new collection of training data.

The present invention addresses this problem in a different manner that avoids the need to train a model for a new domain, using a novel mechanism in which a generic pretrained paraphrase model can determine similarity between two sentences without regard to domain.

SUMMARY

According to an exemplary embodiment, the present invention describes a method (and structure and computer product) of machine translation for processing input questions that includes receiving, in a processor on a computer, an input question presented in a natural language. The input question is preprocessed to find condition values and possible Structured Query Language (SQL) queries are enumerated based on the found condition values. A paraphrasing model ranks the enumerated SQL queries and the highest ranked SQL query is then executed against a database.

In another exemplary aspect, also described herein is a computer-based method of responding to an input question to query a database that includes using a natural language engine to receive an input question in a natural language, using a processor on a computer; generating utterances from the input question; generating a listing of possible Structured Query Language (SQL) queries from the words of the input question; generating utterances in the natural language engine of the possible SQL queries; for each possible SQL query, executing a paraphrase model that measures a similarity between utterances generated for that SQL query and the utterances generated from the input question; determining which possible SQL query has the highest similarity; executing a query on the database using the SQL query determined to have the highest similarity; and providing a response to the input question by reporting a result of the executed SQL query.

In another exemplary aspect, also described herein is a computer system including at least one processor; and a memory device storing machine-readable instructions permitting the processor to execute a method for responding to an input question to query a database accessible to the computer system. The method includes receiving an input question presented in a natural language; enumerating one or more possible Structured Query Language (SQL) queries from the received input question; using a paraphrasing model to rank the enumerated SQL queries and executing this highest-ranked SQL query against the database to search the database; and providing a result of the executing of the highest-ranked SQL query as a response to the input question.

DETAILED DESCRIPTION

Figure 1:
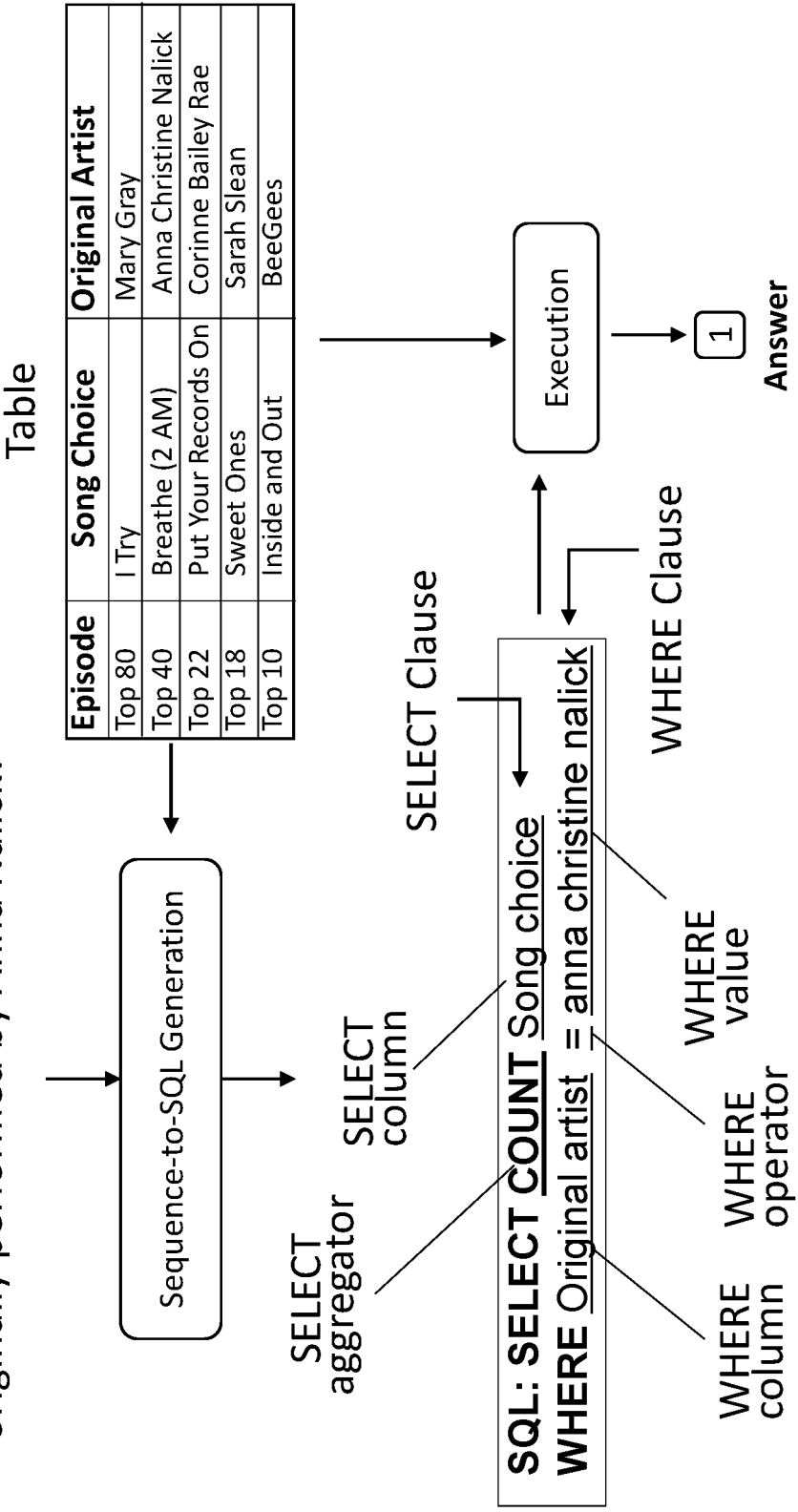
FIG. 1 shows an exemplary SQL query used to explain the method of the present invention.

The present invention introduces a paraphrase-based method to approach the NLIDB task, which is one example of the more generic Table QA task, as referring to the problem of a computer system to answer a natural language question using table structured data, such as a relational database. FIG. 1 shows exemplarily an input question 100 that would require a table (also referred to herein as a database) search to provide answer 102 as an output that answers the question. The method disclosed by the present invention does not rely on text-logical form pairs to be used as training data and therefore can efficiently adapt to new domains.

In contrast to the conventional methods, the present invention tackles the Table QA problem as a sentence similarity problem, which does not require a question-SQL query as training data. Instead, the sentence similarity approach considers the problem to be one of sentence pairs. Therefore, by training a paraphrase model in, for example, a supervised fashion, the present invention eliminates the requirement of the large amount of training data, as required in conventional methods, since the comparison of the present invention compares two sentences by determining similarities of utterances in the two sentences.

Moreover, because the method of the present invention converts an SQL query using a universal template, it further enables a method that is robust to any domain. Additionally, since this new method does not require question-SQL queries as training data it is much easier to adapt to new domains.

Figure 2:
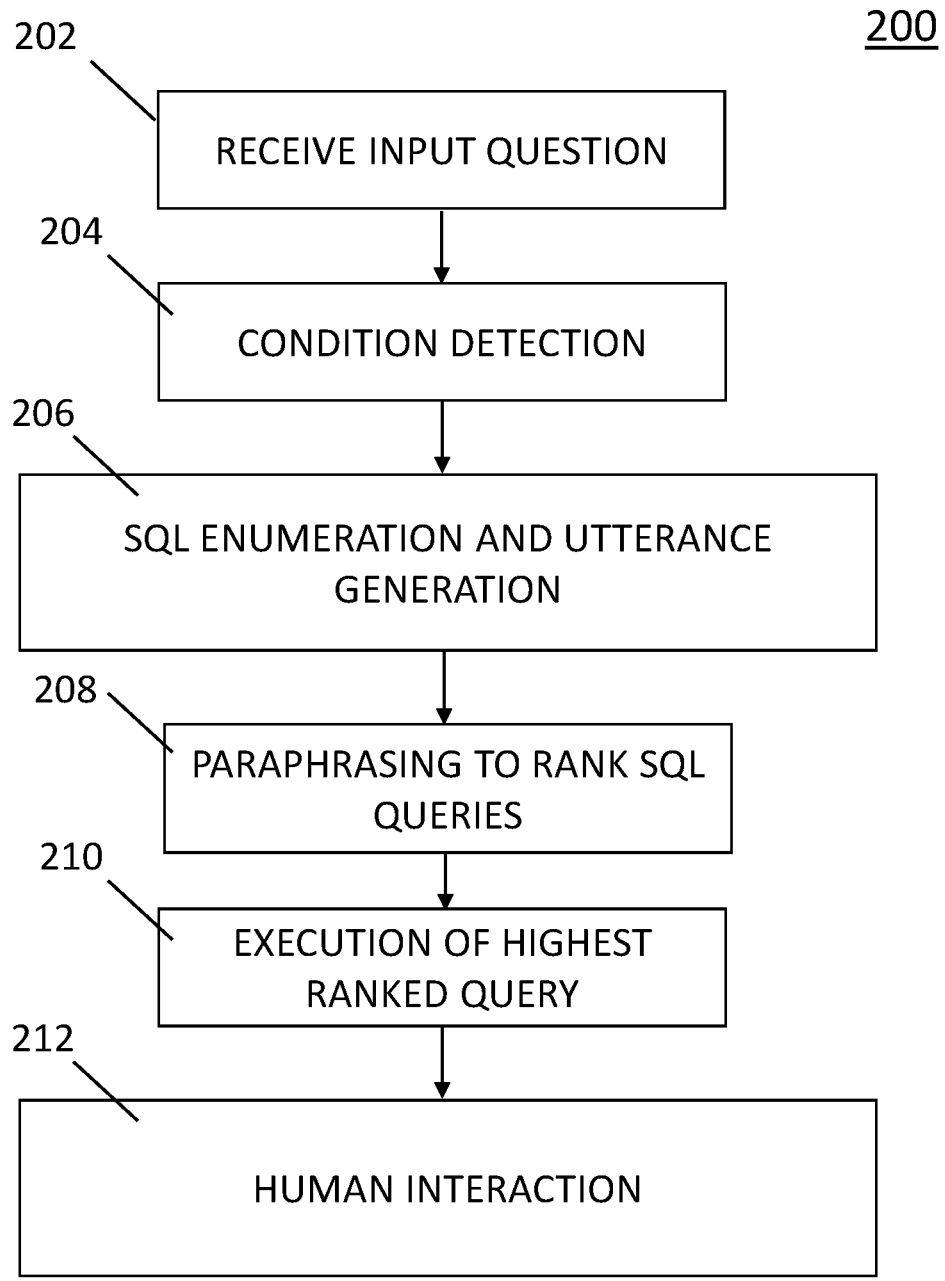
FIG. 2 shows in flowchart format the basic sequence of an exemplary embodiment of the present invention.

FIG. 2 shows steps of an exemplary embodiment of the paraphrasing method of the present invention based on the exemplary input question shown in FIG. 1: "What is the total number of songs originally performed by Anna Nalick?".

The flowchart 200 in FIG. 2 shows an exemplary embodiment of the present invention. In summary of FIG. 2, a user's input question is received in step 202 and initially preprocessed to find all condition values, in step 204, as well as extracting the utterances from the input question, using a natural language engine. Then, in step 206, possible SQL queries are enumerated based on these conditions. For each possible SQL query, an utterance sequence is generated using a simple template. The SQL queries are ranked in step 208 by using a pre-trained paraphrasing model that compares utterances between two sentences.

In this strategy, a model does not need to be trained when adapting to a new domain, while still obtaining good performance due to the pre-trained paraphrasing model as prepared using possibly millions of documents during training. The highest-ranked SQL query is then executed over the database in step 210, and results of the query are returned to the user in step 212.

Returning now to step 202 in FIG. 2, this step provides a user's input question. The mechanism by which the input question is entered is not considered important in the context of the present invention, since the user could enter a question as a text inquiry or by verbally asking a question using a microphone, with the acoustic input then being converted using a natural language engine.

Step 204 achieves condition detection and is designed to detect the value constraints in the received input question. For example, for the example question "what is the total number of songs originally performed by Anna Nalick?". In this step and this example, the method detects only Anna Nalick as a constraint value of interest. Verbs that could or should be mapped to SQL operations are not detected at this step, since the present invention does not use a mapping table. Instead, this matter is approached by using the paraphrase model which could determine the similarities from a raw corpus, such that operational actions will be placed into condition clauses of a corresponding possible SQL query in step 206.

Step 204 is achieved using N-grams matching against values in the Table, by NER (Named-Entity Recognition) tagging, and by Named Entity Linking. Thus, given this example question "what is the total number of songs originally performed by anna nalick?", (1) N-grams matching attempts to match "Anna Nalick" against the "Anna Christine Nalick" in the table from the string matching perspective; (2) NER tagging technology may match "Anna Nalick" against the column Artist since both of them are tagged as PERSON; (3) Named Entity Linking is a similar technology as NER tagging, which links "anna nalick" to "Anna Christine Nalick". This step 204 is independent of any specific database/table since it applies string matching technology rather than any attributes or data of any specific database.

The next step 206 is a stage in which possible SQL clauses are enumerated and utterances are generated for each proposed SQL clause. These utterances form natural language sentences which are fed to the paraphrase model. Initially and based on the exemplary input question described in FIG. 1, a beam search is used to enumerate "select" and "where" clauses for possible SQL queries. For each candidate SQL query, a template is used to map it to a sequence of utterances in a natural language, so that then in step 208 a pre-trained paraphrase model can be applied to rank the utterances in comparison with the utterance sequence from the input question From such candidate SQL queries, complicated SQL queries can be enumerated to represent the meaning of the input question, and a natural language engine can generate a sequence of utterances for each candidate SQL query.

Thus, taking the question in FIG. 1 as an example, the initial beam search might enumerate such possible SQL queries as {select count song choice where . . . ; select count episode where . . . ; select count . . . where original artist—anna nalick}. Then, for each candidate SQL query, templates are used to formulate a question describing its SQL meaning. For example, for select count episode where . . . , a sentence "how many episodes that . . . " can be produced.

In step 208, a pretrained model, the paraphrase model of the present invention, estimates the probability that a generated sentence describes the meaning of the question that was posted. This probability is calculated by a neural network model that forms the paraphrase model of the present invention. Basically, this model takes two sentences as input, and determines a matching of the two input sentences by using Long Short-Term Memory (LSTM)-based models to compare sequences of utterances of the input question and each candidate SQL query. An LSTM is a Recurrent Neural Network (RNN). Like most RNNs, the LSTM is universal in the sense that, given enough network units, this model can compute anything a conventional computer can compute provided that it has the proper weigh matrix, viewed to be its program.

These candidate SQL queries are then ranked in descending order of these probabilities and the best SQL is selected as the predicted SQL query that will be executed in step 210. Thus, step 208 in FIG. 2 is a paraphrasing step in which a pretrained paraphrase model is utilized. In particular, in an exemplary embodiment, four vectors are used to construct features for training the paraphrase model: (i) two feature vectors from a pair of sentences; (ii) one component-wise difference vector; and (iii) one component-wise multiplication vector. These sentences can be retrieved from the web corpus and also the benchmark datasets. This pretrained paraphrase model is independent to the database since it only evaluates the similarity between two sentences.

The pretrained paraphrase model can be trained in either a supervised or a weak-supervised fashion. In the supervised fashion, the sentence pairs are manually collected. In the weak supervised fashion, the sentence pairs are collected using news copra, meaning a body of news about a same event. The basic assumption underlying the training of paraphrase model is that at the same time window, different news reports describing an event should be considered as paraphrased versions of that same event.

The goal of this paraphrasing step 208 is to train and use the strategy of the present invention to give the similarities between generated utterances from sentences formed of utterances from candidate SQL queries and from the sentence formed of utterances from the user query question.

In step 210 in FIG. 2, the selected SQL query is executed against the intended relational database and the answers are returned to the user, which step is conventional and well known in the art. In Step 212, the answer(s) and the interpretation of the SQL query are presented to the user using natural language sentences, which can be achieved using templates. Thus, in addition to returning to the user via a natural language engine the results of each SQL query, the method could also return the selected SQL query to the user for review of how the database was searched to obtain the reported result. Prior to the present invention, this method of making both the results of the SQL query and the SQL interpretation of the answer-searching process to the user has not been done in conventional Table QA problem solutions.

Implementation

The above-described exemplary embodiment of the present invention could be implemented in a computer-based system in various ways, including its utilization either as a cloud service or via a remotely located service accessible by a user or even on the user's machine itself.

It would also to be understood by one of ordinary skill that, although this disclosure includes a detailed description of implementation on cloud computing, as follows, the implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
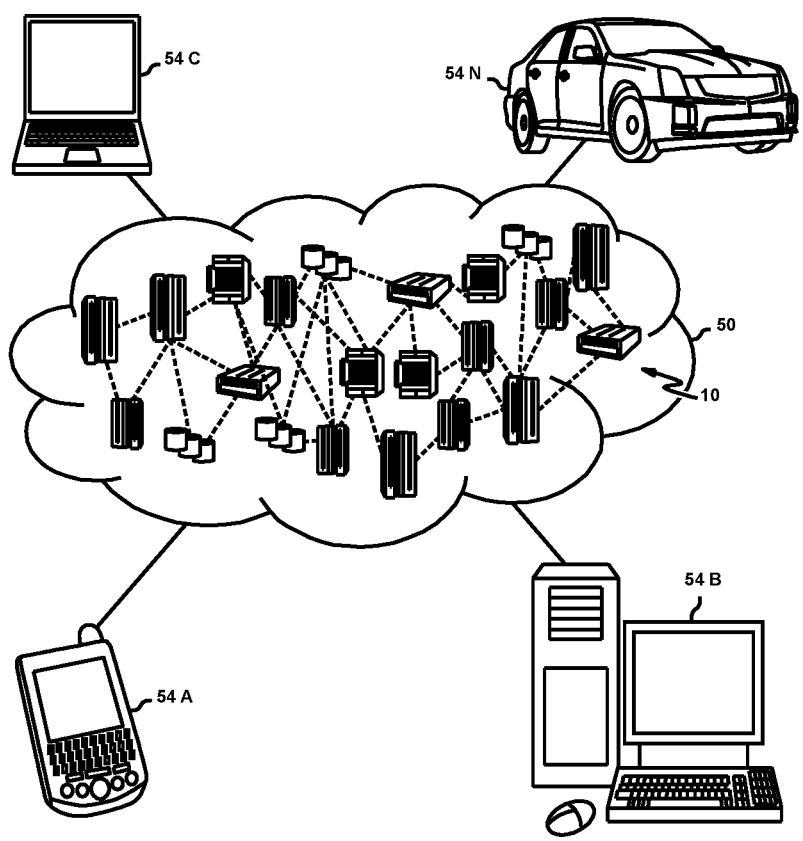
FIG. 3 depicts a cloud computing environment according to an embodiment of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
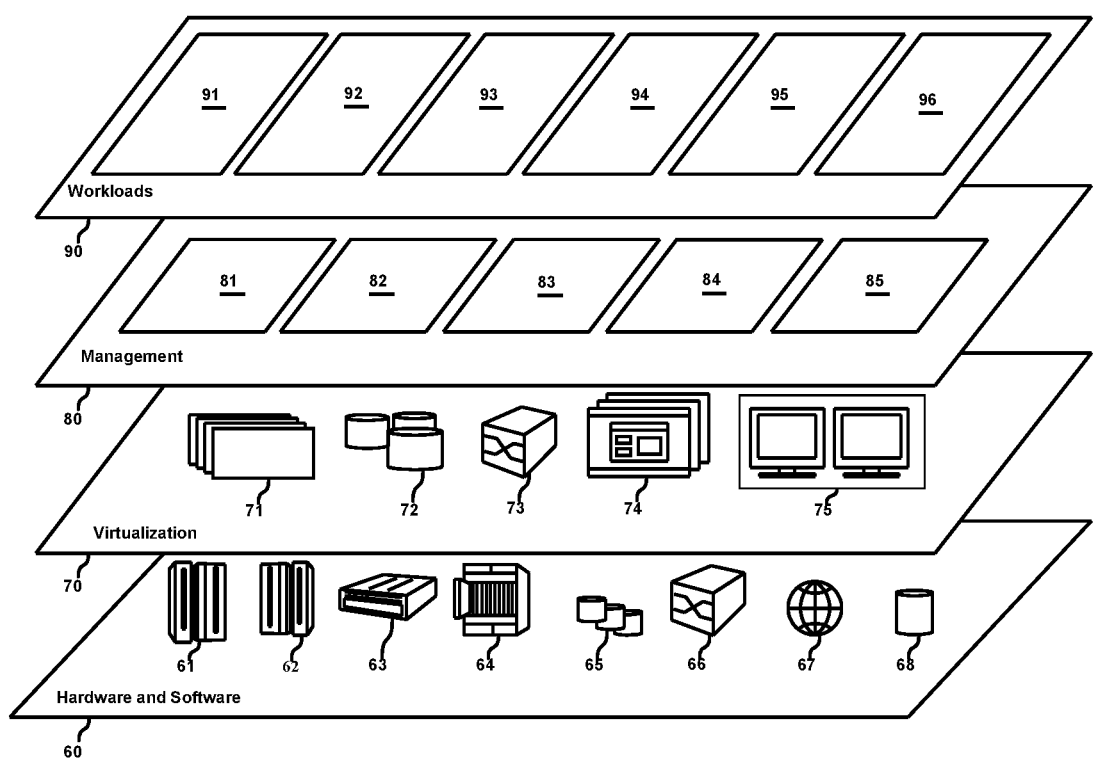
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality 91-96 for which the cloud computing environment may be utilized. Examples of workloads and functions which may be provided from this layer include tasks related to the implementation of the present invention such as, for example, receiving a natural language input query from a non-expert user, exercising the paraphrase method of the present invention, and then returning results of the SQL query search to the user via the natural language interface, along with the SQL query if desired by the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the invention has been described in terms of several exemplary embodiments, those skilled in the art will recognize that the invention can be practiced with modification.

Further, it is noted that, Applicants' intent is to encompass equivalents of all claim elements, even if amended later during prosecution.

What is claimed is:

1. A method of machine translation for processing input questions,
    the method comprising:
    receiving, in a processor on a computer, an input question presented in a natural language;
    preprocessing, using the processor, the input question to find one or more condition values for Structured Query Language (SQL) queries;
    enumerating one or more SQL queries based on the one or more found condition values;
    using a paraphrasing model to rank the enumerated one or more SQL queries, the paraphrasing model pretrained to determine a comparison of sequences of utterances in two sentences, a first sentence comprising the input question and the second sentence comprising an SQL query of the enumerated one or more SQL queries;
    selecting a highest ranked SQL query; and
    executing this highest-ranked SQL query against a database to search the database for a response to the input question.

2. The method of claim 1, further comprising returning a result or results of executing the highest-ranked SQL query to answer the input question.

3. The method of claim 2, wherein a natural language engine is also used to provide an answer to the input question to a user.

4. The method of claim 3, wherein an interpretation of the highest-ranked SQL query is also provided to the user, using the natural language engine, to interpret the highest-ranked SQL query that was executed to query the database,
    wherein the paraphrasing model comprises a pre-trained Long Short-Term Memory (LSTM)—based model receiving two sentences of sequences of utterances as input and determining a similarity of the two sentences,
    wherein the paraphrasing model that is pre-trained comprises a Long Short-Term Memory Recurrent Neural Network (LSTM RNN).

5. The method of claim 1 wherein the paraphrasing model comprises a pre-trained Long Short-Term Memory (LSTM)—based model receiving two sentences of sequences of utterances as input and determining a similarity of the two sentences.

6. The method of claim 5, wherein the paraphrasing model that is pre-trained comprises a Long Short-Term Memory Recurrent Neural Network (LSTM RNN).

7. The method of claim 5, wherein the paraphrasing model that is pre-trained is trained in one of a supervise fashion and a weak supervised fashion.

8. The method of claim 5 in which the paraphrasing model that is pre-trained is trained in a supervised fashion in which sentence pairs used for training are manually collected.

9. The method of claim 5 wherein the paraphrasing model that is pre-trained is trained in a weak supervised fashion, in which sentence pairs used for training are collected using a body of news about a same event.

10. The method of claim 1, as implemented in a cloud service, wherein a plurality of vectors used to construct features for training the paraphrasing model includes two feature vectors from a pair of sentences, one component-wise difference vector, and one component-wise multiplication vector.

11. The method of claim 1, as implemented on a server having access to the database including a relational database.

12. A non-transitory memory device storing therein a set of computer-readable instructions to enable a computer to execute the method of claim 1.

13. A method of responding to an input question to query a database, the method comprising:
receiving an input question in a natural language, using a processor;
generating a sequence of utterances from the input question;
generating a listing of possible Structured Query Language (SQL) queries from words of the input question;
generating a sequence of utterances of each possible SQL query;
for each possible SQL query, executing a paraphrase model that measures a probability of similarity between a sequence of utterances generated for that SQL query and the sequence of utterances generated from the input question;
determining which possible SQL query has the highest probability of similar meaning;
executing a query on the database using the SQL query determined to have the highest probability of similar meaning; and
providing a response to the input question by reporting a result of the executed SQL query.

14. The method of claim 13, wherein the paraphrase model comprises a pre-trained Long Short-Term Memory Recurrent Neural Network (LSTM RNN) that receives two sentences as input and determines a similarity of the two sentences.

15. The method of claim 13, further comprising providing an interpretation of the SQL query that was executed.

16. A non-transitory memory device storing therein a set of computer-readable instructions to enable a computer to execute the method of claim 13, wherein a plurality of vectors used to construct features for training the paraphrase model includes two feature vectors from a pair of sentences, one component-wise difference vector, and one component-wise multiplication vector.

17. A computer system, comprising:
at least one processor; and
a memory device storing machine-readable instructions permitting the at least one processor to execute a method for responding to an input question to query a database accessible to the computer system, wherein the method comprises:
receiving an input question presented in a natural language;
enumerating at least one possible Structured Query Language (SQL) query from the received input question;
using a paraphrasing model that is pre-trained to rank the enumerated at least one possible SQL query based on a similarity and executing a highest-ranked SQL query against the database to search the database; and
providing a result of the executing of the highest-ranked SQL query as a response to the input question,
wherein the paraphrasing model comprises a
pre-trained Long Short-Term Memory Recurrent Neural Network (LSTM RNN) that
receives two sentences as input and determines a similarity of the two sentences,
wherein one sentence of the two sentences comprises utterances generated from the input question and the other sentence comprises utterances generated from a possible SQL query.

* * * * *